US012722437B2

(12) United States Patent
Randall et al.

(10) Patent No.: US 12,722,437 B2
(45) Date of Patent: Sep. 1, 2026

(54) INTEGRATED DAMPER RIDE HEIGHT SYSTEM

(71) Applicant: Fox Factory, Inc., Duluth, GA (US)

(72) Inventors: Connor Randall, Poncha Springs, CO (US); Karl Jensen, Jefferson, GA (US)

(73) Assignee: Fox Factory, Inc, Duluth, GA (US)

( * ) Notice: Subject to any disclaimer, the term of this patent is extended or adjusted under 35 U.S.C. 154(b) by 0 days.

(21) Appl. No.: 19/274,004

(22) Filed: Jul. 18, 2025

(65) Prior Publication Data

US 2026/0152032 A1 Jun. 4, 2026

Related U.S. Application Data

(63) Continuation of application No. 18/966,593, filed on Dec. 3, 2024, now Pat. No. 12,384,212.

(51) Int. Cl.
*B60G 17/015* (2006.01)
*B60G 17/019* (2006.01)

(52) U.S. Cl.
CPC ....... *B60G 17/0152* (2013.01); *B60G 17/019* (2013.01); *B60G 2202/31* (2013.01); *B60G 2202/413* (2013.01); *B60G 2400/95* (2013.01); *B60G 2500/302* (2013.01)

(58) Field of Classification Search
CPC .............. B60G 17/0152; B60G 17/019; B60G 2202/31; B60G 2202/413; B60G 2400/95; B60G 2500/302
See application file for complete search history.

(56) References Cited

U.S. PATENT DOCUMENTS

| | | | | |
|---|---|---|---|---|
| 8,757,636 | B2 * | 6/2014 | Kasuga | B62K 25/04 280/5.514 |
| 8,864,146 | B2 * | 10/2014 | Murakami | B62K 25/06 280/6.157 |
| 9,162,548 | B1 * | 10/2015 | Wakeman | F16F 1/121 |
| 9,180,746 | B2 * | 11/2015 | Kasuga | B60G 17/015 |
| 11,021,031 | B2 | 6/2021 | Steinmetz et al. | |
| 11,820,186 | B2 | 11/2023 | Gerlin et al. | |

(Continued)

FOREIGN PATENT DOCUMENTS

| | | |
|---|---|---|
| CN | 115773332 | 3/2023 |
| CN | 117698361 | 3/2024 |
| EP | 3995717 | 5/2022 |

*Primary Examiner* — Toan C To
(74) *Attorney, Agent, or Firm* — Schmeiser Olsen PLLC

(57) ABSTRACT

An integrated ride height system is provided wherein the system is configured couple to a vehicle. The system includes a coilover shock absorber and a hydraulic preload cylinder coupled to a shock body of the coilover shock absorber. The hydraulic preload cylinder engages an end of a coil spring of the coilover shock absorber. The system includes a reservoir coupled to the shock absorber allowing hydraulic fluid to flow between the reservoir and the coilover shock absorber. The system includes a reversible pump coupled between the hydraulic preload cylinder and the reservoir, wherein the pump operates to pump hydraulic fluid from the reservoir to the hydraulic preload cylinder to extend the hydraulic preload cylinder to increase ride height of the vehicle and operates to pump hydraulic fluid from the hydraulic preload cylinder to the reservoir to retract the hydraulic preload cylinder to decrease ride height of the vehicle.

12 Claims, 5 Drawing Sheets

(56) References Cited

U.S. PATENT DOCUMENTS

| | | | | |
|---|---|---|---|---|
| 11,912,086 | B2 | 2/2024 | Steinmetz et al. | |
| 12,384,212 | B1 * | 8/2025 | Randall | B60G 17/019 |
| 2005/0189685 | A1 * | 9/2005 | Verriet | B60G 17/021<br>267/34 |
| 2022/0134830 | A1 | 5/2022 | Voelkel et al. | |
| 2022/0380004 | A1 * | 12/2022 | Walker | B60G 17/08 |
| 2023/0037444 | A1 * | 2/2023 | Sardes | B60G 17/0416 |
| 2023/0256789 | A1 * | 8/2023 | Jefferies | B60G 17/017<br>280/124.16 |
| 2024/0300275 | A1 * | 9/2024 | Anderson | H02K 7/14 |

* cited by examiner

INTEGRATED DAMPER RIDE HEIGHT SYSTEM

CROSS REFERENCE TO RELATED APPLICATION[S]

This application claims priority to U.S. patent application Ser. No. 18/966,593, filed Dec. 3, 2024, the disclosure of which is hereby incorporated entirely herein by reference.

BACKGROUND OF THE INVENTION

Technical Field

This invention relates generally to a ride height system and more particularly to an integrated ride height system.

State of the Art

In operation of a vehicle, adjusting ride height can be desirable for vehicle performance, payload adjustment, and ground clearance. Conventional systems typically use external pump systems. These external pumps require additional valve control manifolds and long hydraulic hose lines that can be complex and costly to implement. There does not exist a fully integrated system to adjust ride height of a vehicle.

Accordingly, there is a need for an integrated ride height system that is a fully integrated system that includes a pump mounted to the shock to move a hydraulic preload cylinder to adjust ride height.

SUMMARY OF THE INVENTION

An embodiment includes an integrated ride height system configured couple to a vehicle, the system comprising: a coilover shock absorber; a hydraulic preload cylinder coupled to a shock body of the coilover shock absorber, wherein the hydraulic preload cylinder engages an end of a coil spring of the coilover shock absorber; a reservoir coupled to the shock absorber allowing hydraulic fluid to flow between the reservoir and the coilover shock absorber; and a reversible pump coupled between the hydraulic preload cylinder and the reservoir, wherein the pump operates to pump hydraulic fluid from the reservoir to the hydraulic preload cylinder to extend the hydraulic preload cylinder to increase ride height of the vehicle and operates to pump hydraulic fluid from the hydraulic preload cylinder to the reservoir to retract the hydraulic preload cylinder to decrease ride height of the vehicle.

Another embodiment includes a method of using an integrated ride height system, the method comprising: coupling an integrated ride height system to a vehicle, the system comprising: a coilover shock absorber; a hydraulic preload cylinder coupled to a shock body of the coilover shock absorber, wherein the hydraulic preload cylinder engages an end of a coil spring of the coilover shock absorber; a reservoir coupled to the shock absorber allowing hydraulic fluid to flow between the reservoir and the coilover shock absorber; and a reversible pump coupled between the hydraulic preload cylinder and the reservoir; activating the reversible pump in a first direction to pump hydraulic fluid from the reservoir to the hydraulic preload cylinder to increase ride height of the vehicle; and activating the reversible pump in a second direction to pump hydraulic fluid from the hydraulic preload cylinder to the reservoir to decrease ride height of the vehicle.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to an integrated ride height system that is a fully integrated system that includes a pump mounted to the shock to move a hydraulic preload cylinder to adjust ride height.

Figure 1:
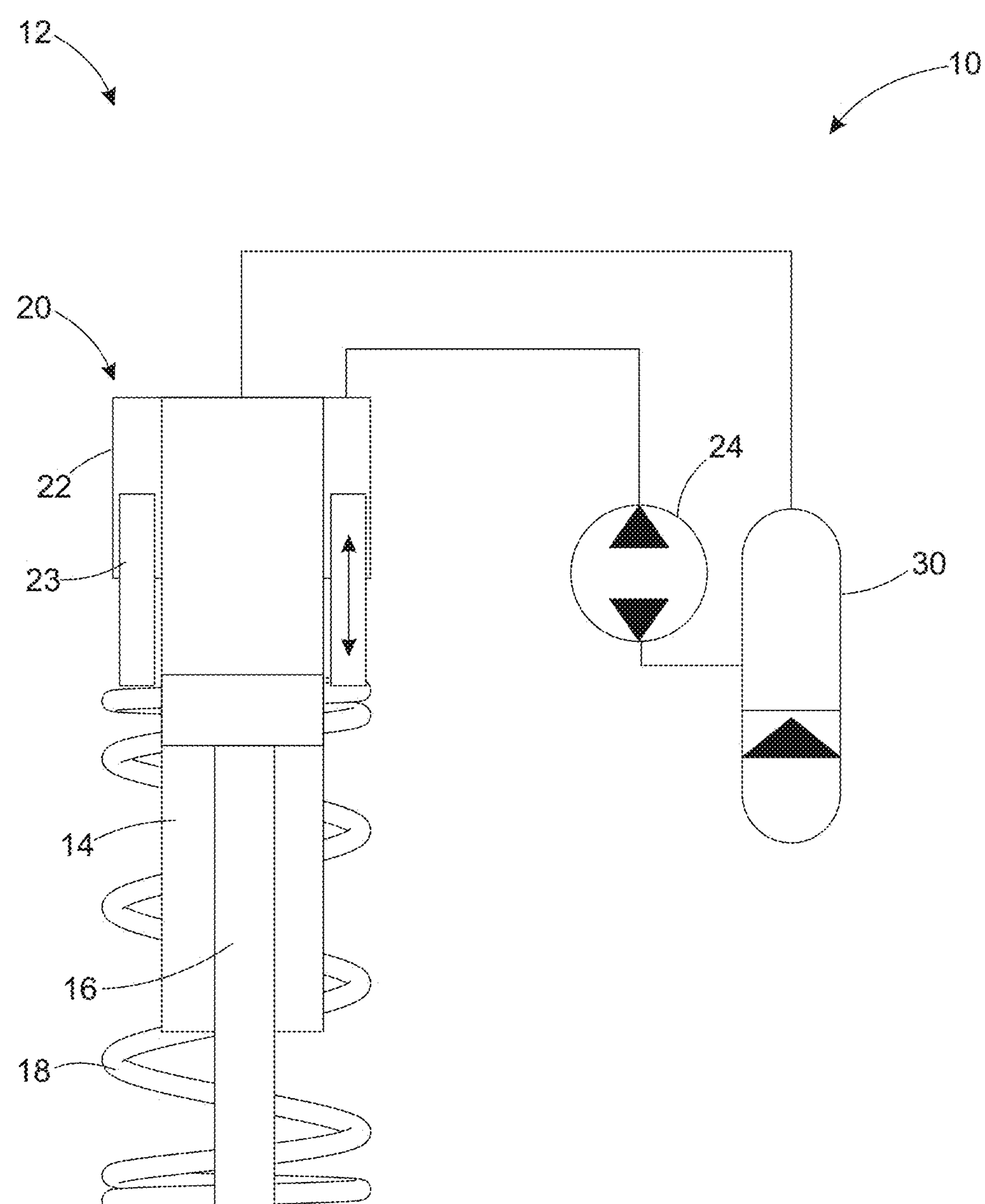
FIG. 1 is a diagrammatic view of an integrated ride height system according to an embodiment.

Referring to FIG. 1, an embodiment of an integrated ride height system 10 comprising a coilover shock absorber 12, a hydraulic preload cylinder 20 coupled to the shock absorber 12, a reservoir 30 coupled to the shock absorber 12, and a pump 24 coupled between the reservoir 30 and the hydraulic preload cylinder 20. The coilover shock absorber 12 comprises a shock body 14, a piston 15 coupled to a piston shaft 16 and operable within the shock body 14 and a coil spring 18 operatively coupled around the shock body 14. The hydraulic preload cylinder 20 further comprises a preload body 22 and a cylinder member 23 operatively coupled within the preload body 22. The hydraulic preload cylinder 20 may be coaxial with the shock body 12 and coupled around the shock body 12, with an end of cylinder member 23 engaging an end of the coil spring 18. The reservoir 30 may be coupled to the shock absorber 12 in a conventional manner allowing the flow of hydraulic fluid between the shock body 14 and the reservoir 30 during operation of the shock absorber 12 while a vehicle (not shown) operates with the shock absorber 12 coupled thereto. The pump 24 may be coupled between the reservoir 30 and the hydraulic preload body 22 of the hydraulic preload cylinder 20. The system 10 requires no additional valves, hoses, check systems, and so forth.

The integrated ride height system 10 operates to adjust the ride height of the vehicle to which the system 10 is coupled. In embodiments, the pump 24 is a bidirectional pump or a reversible pump. To increase the ride height of the vehicle, the pump 24 operates in a first direction to pump hydraulic fluid from the reservoir 30 to the hydraulic preload body 22 that extends the hydraulic preload cylinder 20 out of the preload body 22 (extended position), wherein the preload cylinder 20 engaging the coil spring 18 increases preloading of the coil spring 18 and thereby increase the ride height of the vehicle. To decrease the ride height of the vehicle, the pump 24 operates in a second direction to pump hydraulic fluid from the hydraulic preload body 22 to the reservoir 30 to retract the hydraulic preload cylinder 20 into the preload body 22 (retracted position), wherein the preload cylinder 20 engaging the coil spring 18 reduces the preloading and reduces the ride height of the vehicle. It is understood that in operation, multiple integrate ride height systems 10 may be employed for each wheel of the vehicle.

Figure 2:
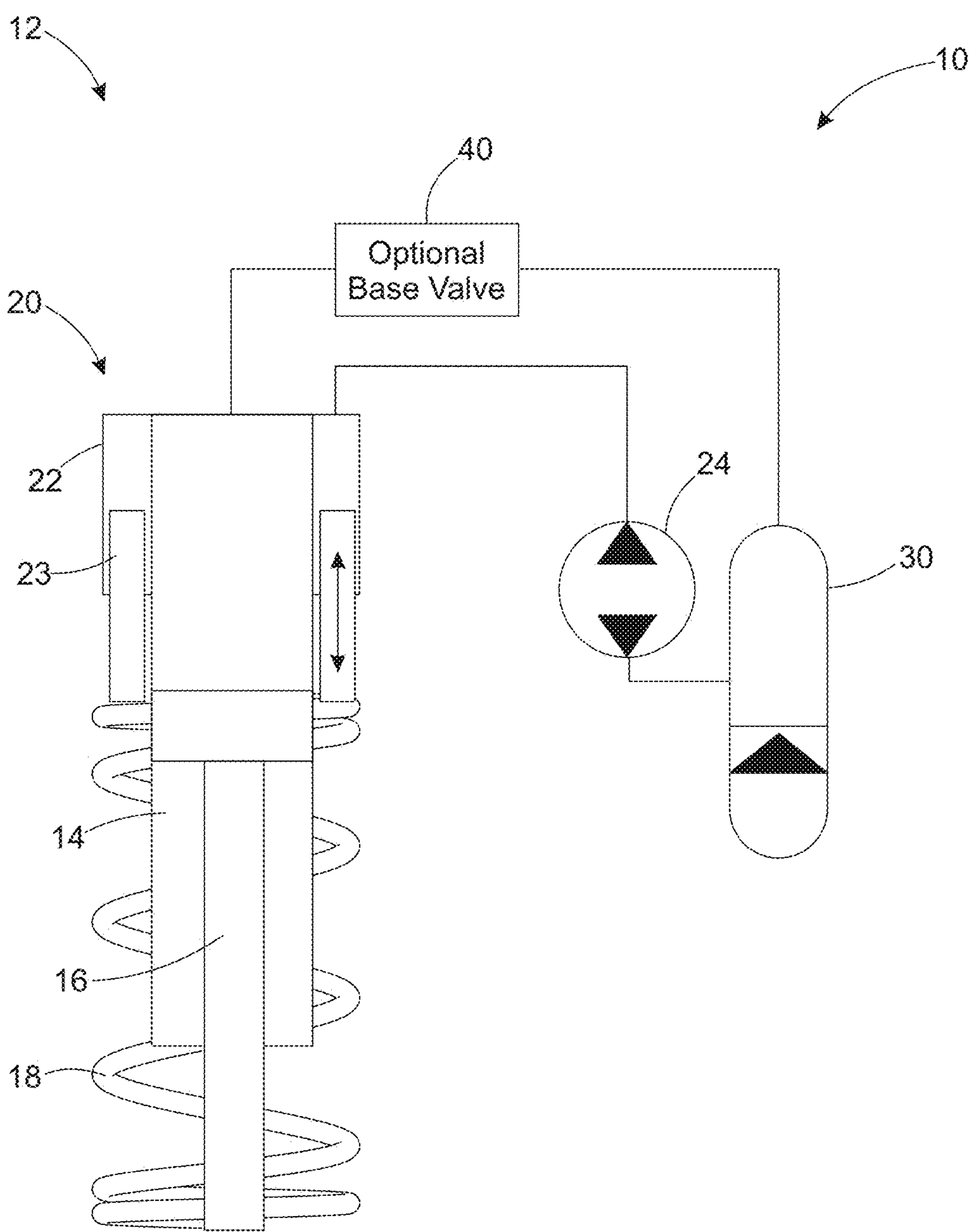
FIG. 2 is a diagrammatic view of an integrated ride height system with an optional base valve according to an embodiment.

Referring further to the drawings, FIG. 2 depicts an integrated ride height system 10 as described with regard to FIG. 1 above and further comprises an optional base valve 40. The base valve 40 may be coupled between the shock body 14 and the reservoir 30 and operates as a typical base valve to control pressure build up and operate a pressure relief for the shock absorber 12 during operation.

Figure 3:
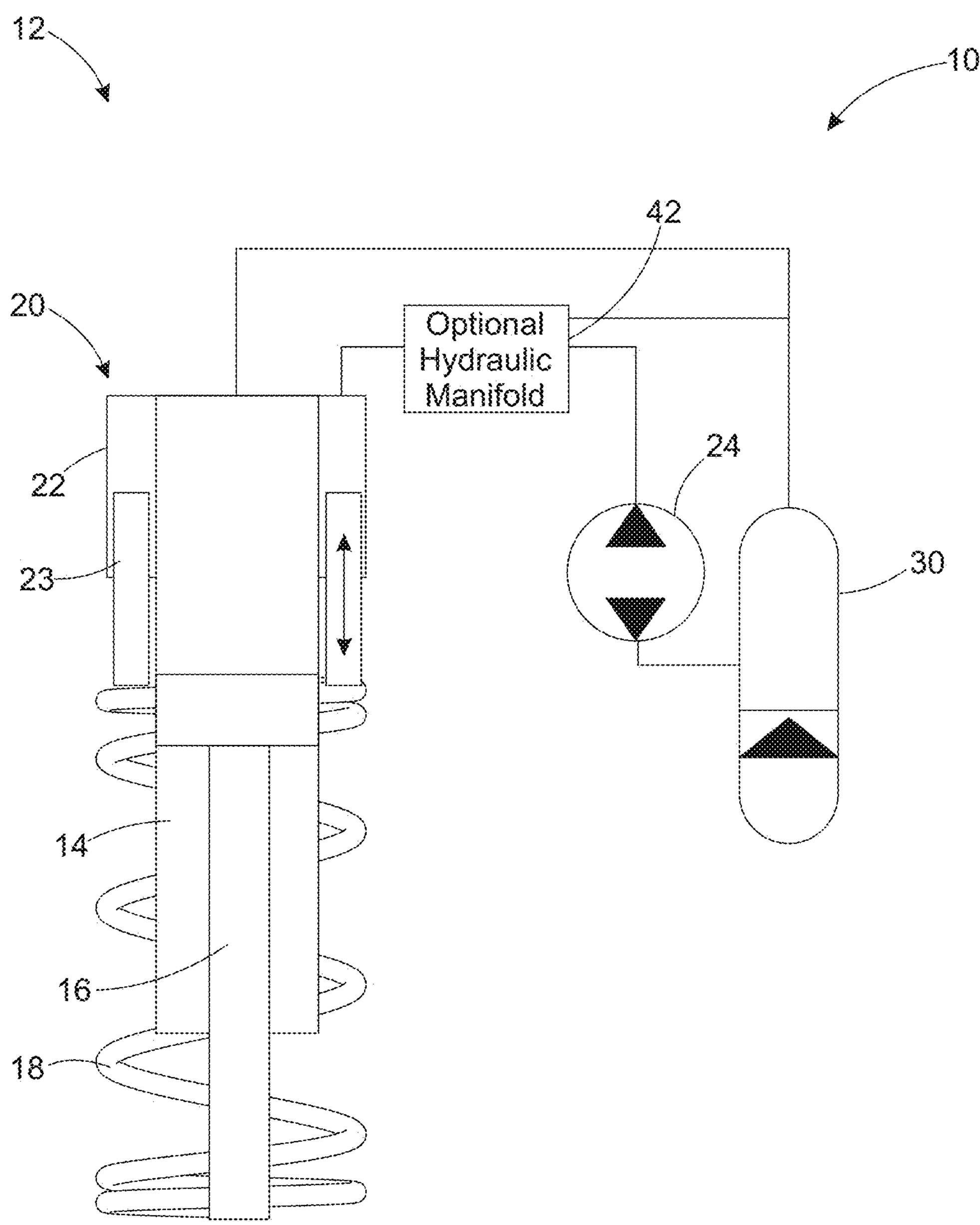
FIG. 3 is a diagrammatic view of an integrated ride height system with an optional hydraulic manifold according to an embodiment.

Referring further to FIG. 3, depicted is an integrated ride height system 10 as described with regard to FIG. 1 above and further comprising an optional hydraulic manifold 42. The hydraulic manifold 42 may be coupled between the preload body 22 and the pump 24, with an additional fluid coupling from the hydraulic manifold 42 to the reservoir 30 that bypasses the pump 24. In operation, the hydraulic manifold 42 may comprise valving to rapidly dump pressure from the preload body 22 that bypasses the reversible pump 24 and flows hydraulic fluid directly from the preload body 22, through the hydraulic manifold 42 and into the reservoir 30. The valving of the hydraulic manifold 42 further allows for operation of the pump 24 to pump hydraulic fluid between the reservoir 30 and the preload body 22 through the hydraulic manifold in order to the increase and decrease the ride height of the vehicle.

Figure 4:
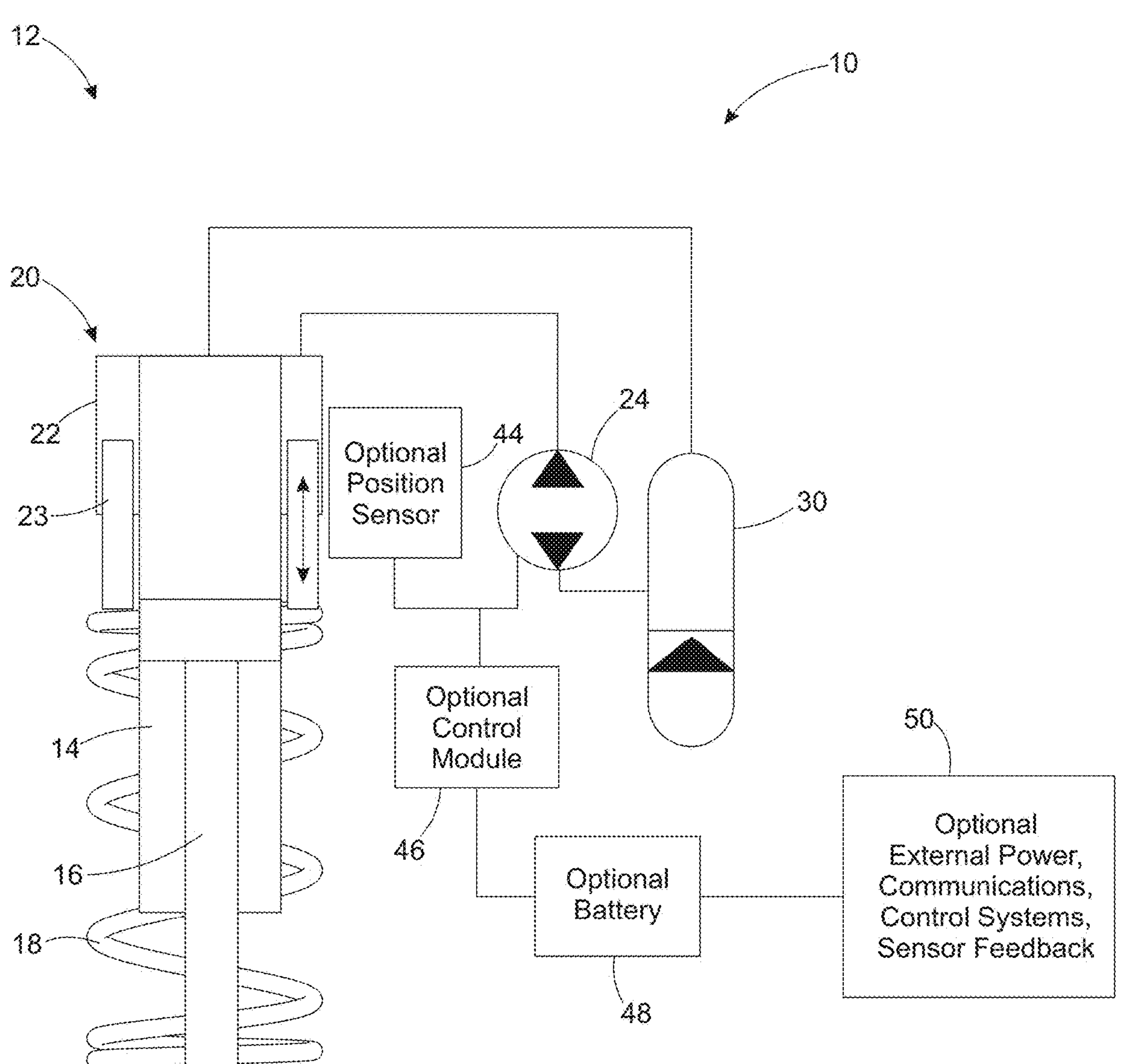
FIG. 4 is a diagrammatic view of an integrated ride height system with an optional position sensor, control module and so forth according to an embodiment.
Figure 5:
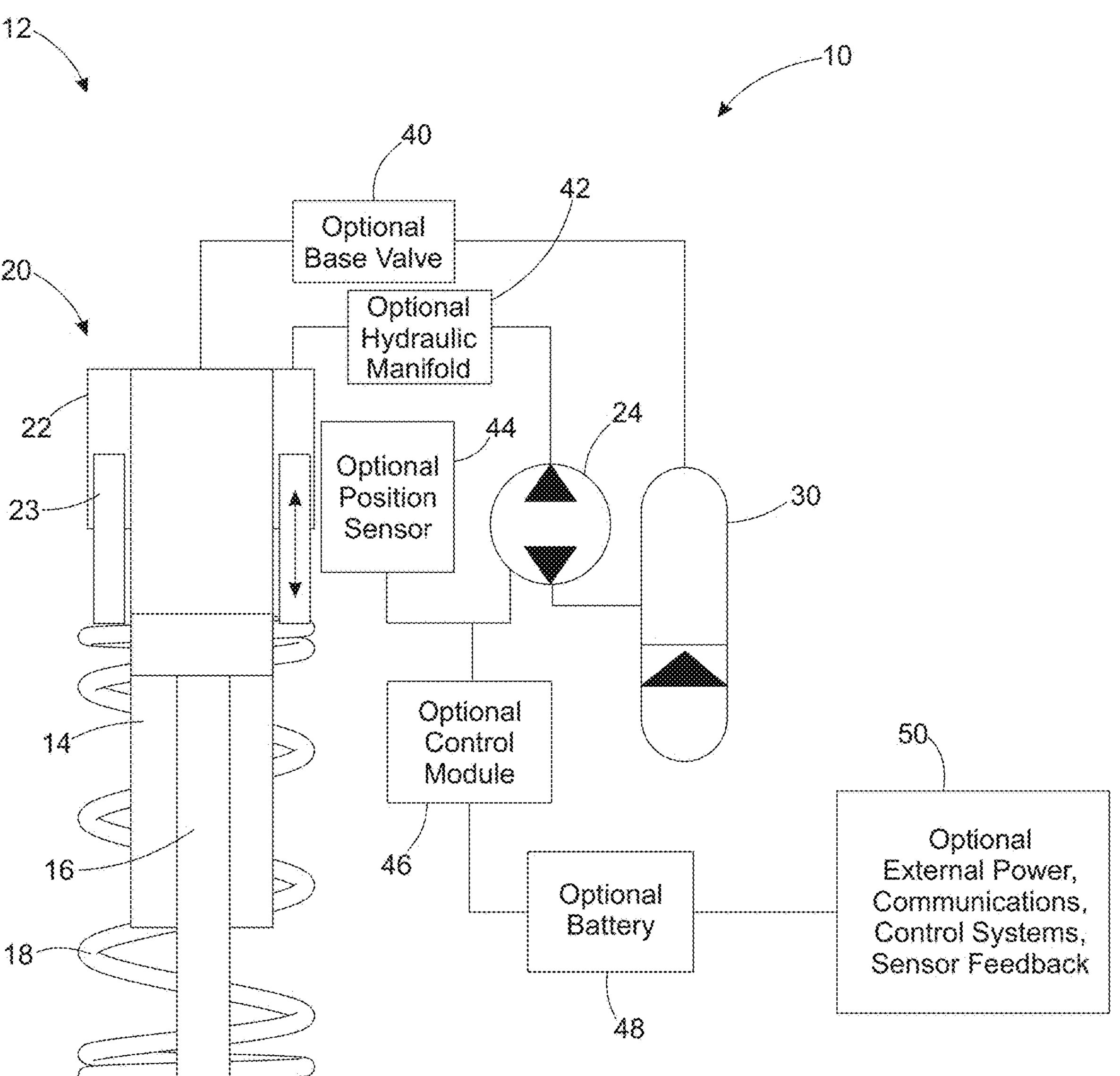
FIG. 5 is a diagrammatic view of an integrated ride height system with an options base valve, hydraulic manifold, position sensor, control module and so forth according to an embodiment.

Referring additionally to FIG. 4, depicted is an integrated ride height system 10 as described with regard to FIG. 1 above and further comprising an optional position sensor 44. The position sensor 44 may be coupled to the pump 24, wherein the position sensor 44 may determine a ride height of the vehicle and the pump 24 automatically operates to adjust the ride height based on input from the position sensor 44. In embodiments, an optional control module 46 may be coupled to the position sensor 44 and the pump 24, wherein the control module 46 operates to control pump 24 based on input from the position sensor 44. An option battery 48 may be incorporated to power the control module 46 or to provide back-up power to the control module 46. Additional components may be included as indicated in box 50 with optional external power, communications (including wireless communications), control systems, sensor feedback, etc.

Another embodiment includes a method of using an integrated ride height system 10. The method comprises coupling an integrated ride height system 10 to a vehicle; activating the reversible pump in a first direction to pump hydraulic fluid from the reservoir to the hydraulic preload cylinder to increase ride height of the vehicle; and activating the reversible pump in a second direction to pump hydraulic fluid from the hydraulic preload cylinder to the reservoir to decrease ride height of the vehicle.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. An integrated ride height system configured couple to a vehicle, the system comprising: a coilover shock absorber comprising a shock body and a single coil spring operatively coupled around the shock body; a hydraulic preload cylinder coupled to the shock body of the coilover shock absorber, wherein the hydraulic preload cylinder engages an end of the single coil spring; and a pump coupled to the hydraulic preload cylinder, wherein the pump operates to pump hydraulic fluid into the hydraulic preload cylinder to extend the hydraulic preload cylinder to increase ride height of the vehicle.

2. The system of claim 1, wherein the coilover shock absorber comprises the shock body, a piston coupled to a piston shaft and operable within the shock body, and the coil spring operatively coupled around the shock body.

3. The system of claim 1, wherein the hydraulic preload cylinder comprises a preload body and a cylinder member operatively coupled within the preload body.

4. The system of claim 3, wherein the hydraulic preload cylinder is coaxial with and coupled around the shock body with an end of cylinder member engaging the end of the coil spring.

5. The system of claim 1, further comprising a base valve coupled between the shock body and a reservoir.

6. The system of claim 1, wherein the hydraulic preload cylinder comprises a preload body, the system further comprising a hydraulic manifold coupled between the preload body and the pump, and an additional fluid coupling extending from the hydraulic manifold to a reservoir that bypasses the pump.

7. The system of claim 6, wherein the hydraulic manifold comprises valving to rapidly dump pressure from the preload body that bypasses the pump and flows hydraulic fluid directly from the preload body through the hydraulic manifold and into the reservoir.

8. The system of claim 1, further comprising a position sensor coupled to the pump and a control module coupled to the position sensor and the pump, wherein the control module operates to automatically control the pump based on input from the position sensor.

9. A method of using an integrated ride height system, the method comprising: coupling an integrated ride height system to a vehicle, the system comprising: a coilover shock absorber comprising a shock body and a single coil spring operatively coupled around the shock body; a hydraulic preload cylinder coupled to the shock body of the coilover shock absorber, wherein the hydraulic preload cylinder engages an end of the single coil spring; and a pump coupled to the hydraulic preload cylinder; and activating the pump to pump hydraulic fluid from into the hydraulic preload cylinder to increase ride height of the vehicle.

10. The method of claim 9, wherein the hydraulic preload cylinder comprises a preload body and a cylinder member operatively coupled within the preload body.

11. The method of claim 10, wherein the hydraulic preload cylinder is coaxial with and coupled around the shock body with an end of cylinder member engaging the end of the coil spring.

12. The method of claim 11, wherein activating the pump to pump hydraulic fluid into the hydraulic preload cylinder to increase ride height of the vehicle comprises pumping hydraulic fluid into the preload body and extending the cylinder member out of the preload body to increase preload of the coil spring.

* * * * *